(12) United States Patent
Hakala et al.

(10) Patent No.: US 7,546,113 B2
(45) Date of Patent: Jun. 9, 2009

(54) TRANSMISSION OF CALL DETAIL RECORDS IN A TELECOMMUNICATIONS SYSTEM

(75) Inventors: Harri Tapani Hakala, Turku (FI); Hans Christian Ahlback, Turku (FI); Mika Vaino Oskari Hovi, Turku (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 973 days.

(21) Appl. No.: 09/797,224

(22) Filed: Mar. 1, 2001

(65) Prior Publication Data

US 2001/0024950 A1 Sep. 27, 2001

(30) Foreign Application Priority Data

Mar. 21, 2000 (GB) ................. 0006666.2

(51) Int. Cl.
*H04M 11/00* (2006.01)
(52) U.S. Cl. ................. 455/406; 455/432.1; 455/432.3; 455/433; 455/408
(58) Field of Classification Search ................. 455/406, 455/407, 408, 432.1, 433, 435.1, 432.3
See application file for complete search history.

(56) References Cited

U.S. PATENT DOCUMENTS

| 5,706,330 | A | | 1/1998 | Bufferd et al. |
| 5,732,127 | A | * | 3/1998 | Hayes ................. 379/114.28 |
| 5,912,954 | A | | 6/1999 | Whited et al. |
| 6,108,540 | A | * | 8/2000 | Sonti et al. ................. 455/433 |
| 6,269,244 | B1 | * | 7/2001 | Alperovich et al. ......... 455/433 |
| 6,415,151 | B1 | * | 7/2002 | Kreppel ................. 455/445 |
| 6,418,212 | B1 | * | 7/2002 | Harrison et al. ............ 379/189 |
| 6,463,275 | B1 | * | 10/2002 | Deakin ................. 455/406 |
| 6,480,485 | B1 | * | 11/2002 | Kari et al. ................. 370/352 |
| 6,611,684 | B1 | * | 8/2003 | Franks ................. 455/433 |

FOREIGN PATENT DOCUMENTS

| GB | 2350019 A1 | 11/2000 |
| WO | 97/24007 | 7/1997 |
| WO | 99/27723 A1 | 6/1999 |
| WO | WO 99/27723 | * 6/1999 |

* cited by examiner

*Primary Examiner*—Alexander Eisen
*Assistant Examiner*—Justin Y Lee

(57) ABSTRACT

A method of routing Call Detail Records (CDRs) for a subscriber from a foreign network to a home network while the subscriber is roaming in the foreign network. The method comprises transferring from the home network to the foreign network during registration of the subscriber with an exchange of the foreign network, an address of a billing system of the home network in a signalling network to which said exchange and said billing system are coupled. Said address is associated with CDRs generated by said exchange in respect of the subscriber, and the CDRs transferred from said exchange to said billing system over said signalling network on the basis of the associated address.

6 Claims, 2 Drawing Sheets

TRANSMISSION OF CALL DETAIL RECORDS IN A TELECOMMUNICATIONS SYSTEM

This application claims priority under 35 U.S.C. §§ 119 and/or 365 to 0006666.2 filed in Great Britian on Mar. 21, 2000; the entire content of which is hereby incorporated by reference.

BACKGROUND

The present invention relates to the transmission of Call Detail Records in a telecommunications system and more particularly to the transmission of Call Detail Records between mobile telecommunications networks.

In today's mobile telecommunications networks, the operator of a mobile network is able to maintain tight control over the calls made and services used by its subscribers when they are at home, i.e. when they are registered with the operator's own network. For example, if a subscriber exceeds his calling credit limit the operator can notify the subscriber of this situation and/or can prevent the subscriber from making further calls until his outstanding account is settled. Similarly, where a subscriber makes use of a top-up account, e.g. using scratch cards to credit his account, an operator can restrict the subscriber's access when the subscriber's credit drops to zero.

Such charging control is possible because the Mobile Switching Centre (MSC) which acts as the "local exchange" for a subscriber sends Call Detail Records (CDRs) at regular intervals to a charging node of the subscriber's home network. The frequency at which CDRs are sent is predefined for a given exchange (e.g. every 5 minutes) and is applied to all subscribers registered with that exchange. However, this is only possible when the serving MSC is an MSC of the home network. In the event that a mobile subscriber is registered with an MSC of a foreign network (i.e. the subscriber is "roaming"), CDRs generated by the serving MSC are passed to a home network through a clearing house in so-called TAP files (if necessary, multiple CDRs are collated in the foreign network and the collated CDRs are sent to the clearing house in a single TAP file). The clearing house identifies the destination home network for the TAP files, for example, on the basis of the IMSI code of the calling subscriber. It can take at least two days or even more before the CDRs are forwarded on to the home network.

A home network cannot therefore monitor, in real time or near real time, the charges being incurred by one of its subscribers when that subscriber is roaming in a foreign network. Rather, charging information is only sent periodically from the foreign network to the home network (e.g. every few days). There therefore exists a possibility that fraud by a roaming subscriber will go undetected by the subscriber's home network for some time, and that during that time the home network operator will incur considerable losses.

SUMMARY

The inventors of the present invention have recognised that a solution to the above noted problem is to transfer CDRs from a foreign network to a home network immediately or shortly after they are generated. Thus, it is possible to avoid sending the CDRs to a clearing house, although a clearing house may still be used if desired. To achieve this efficiently it is necessary to provide a mechanism for notifying the foreign network of the address of the billing system of the home network to which the CDRs should be sent.

It is an object of the present invention to overcome or at least mitigate the above noted disadvantages. In particular, it is an object of the present invention to provide cost and fraud control for all subscribers in close to real time. These and other objects are achieved at least in part by notifying a foreign network of the home network billing system address during registration of a mobile subscriber with the foreign network.

According to a first aspect of the present invention there is provided a method of routing Call Detail Records (CDRs) for a subscriber from a serving exchange to a billing system, the method comprising:

transferring from a subscriber register to said serving exchange, an address of a billing system in a signalling network to which said serving exchange and said billing system are coupled;

associating said address with CDRs generated by said serving exchange in respect of the subscriber; and transferring said CDRs from said serving exchange to said billing system over said signalling network on the basis of the associated address.

Embodiments of the present invention enable CDRs to be returned to a billing system soon after they are generated by a serving exchange. The notification of the billing system address during the registration process represents an efficient use of signalling resources in a telecommunications system.

The serving exchange and the subscriber register may be located respectively in a foreign network and a home network, when the subscriber is roaming in the foreign network. Alternatively, the serving exchange and the subscriber register may be located in the same network.

The network(s) may be GSM based and the serving exchange may be an MSC/VLR or a GMSC. Alternatively, the network(s) may be GPRS based (with the serving exchange being a GGSN) or third generation UMTS based.

Preferably, the billing system address is transferred between the subscriber register and the serving exchange using a traffical protocol. More preferably, in a GSM network, the traffical protocol is the Mobile Application Part (MAP) protocol. In particular, the billing system address may be included in one of the MAP messages: InsertSubscriberData; DeleteSubscriberData; and SendRoutingInfoResult. The subscriber register may be a Home Location Register (HLR), the address being sent from the HLR to the serving exchange during a registration process. The subscriber's home network may comprise a plurality of billing systems, with different subscribers being allocated to different billing systems. In certain alternative embodiments, the network(s) is General Packet Radio Service (GPRS) based, with the GPRS Tunnelling Protocol (GTP) being used.

Preferably, the billing system to which the CDRs are sent is a mediation device. CDRs may additionally be routed through a mediation device of a foreign network.

Said signalling network over which the CDRs are sent may be an IP based network, e.g. an ATM network. In this case, the address of the billing system will be an IP address. Said signalling network may be the same as, or different from, the signalling network over which the billing system address is sent from the subscriber register to the serving network.

According to a second aspect of the present invention there is provided a method of routing Call Detail Records (CDRs) for a subscriber from a Gateway MSC (GMSC) to a billing system, the method comprising:

transferring from a Home Location Register (HLR) to the GMSC an address of a billing system in a signalling network to which said GMSC and said billing system are coupled;

associating said address with CDRs generated by said GMSC in respect of the subscriber; and transferring said CDRs from said GMSC to said billing system over said signalling network on the basis of the associated address.

According to third aspect of the present invention there is provided a Home Location Register (HLR) of a mobile telecommunications network, the HLR comprising:

memory means for recording a signalling network address of a billing system of the telecommunications network;

means for receiving a registration request from a serving exchange in respect of a subscriber; and means for responding to said request by returning to said serving exchange the billing system address.

According to a fourth aspect of the present invention there is provided an exchange of a mobile telecommunications network, the exchange comprising:

means for sending a registration request to a subscriber register of a home network of a subscriber seeking to register with the exchange; and means for receiving from said subscriber register an address of a billing system of the home network, the address being an address in a signalling network to which the serving exchange and the billing system are coupled, whereby Call Detail Records (CDRs) subsequently generated by the exchange in respect of said subscriber can be sent to the billing system over said signalling network.

DETAILED DESCRIPTION

Figure 1:
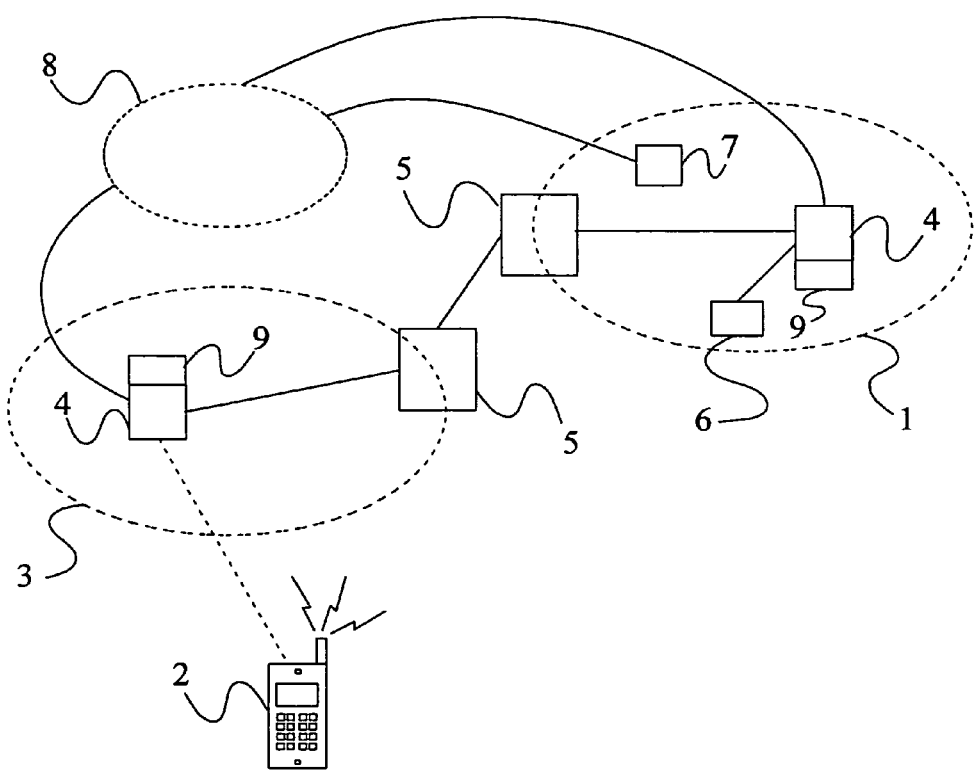
FIG. 1 illustrates schematically a telecommunications system embodying the present invention.

There is illustrated in FIG. 1 a telecommunications system comprising two interconnected Public Land Mobile Networks (PLMNs). For the purposes of the following illustration, a first of the PLMNs 1 represents the home network of a subscriber using a mobile terminal 2, and is referred to as the Home PLMN (HPLMN). The second of the PLMNs 3 is referred to as the Visited PLMN (VPLN). Both networks are Global System for Mobile communications (GSM) based networks and comprise a number of Mobile Switching Centres (MSCs) 4. The networks 1, 2 are coupled via respective Gateway MSCs (GMSCs) 5. Each network also comprises Base Transceiver Stations (BTSs) and Base Station Controllers (BSCs) which serve as the interface between mobile terminals and MSCs, although these are omitted from FIG. 1.

Both of the networks comprise a Home Location Register (HLR) 6 although this is only illustrated in FIG. 1 for the HPLMN 1. The HLR 6 maintains a record of all of the subscribers of the HPLMN 1, including the International Mobile Subscriber Identity (IMSI) for each subscriber and which is used by a subscriber to register with a network. For each subscriber, the HLR 6 records the address of a billing system (e.g. mediation device) 7 of the HPLMN 1. Typically, there is only a single billing system 7 in the HPLMN 1 so that all subscribers are associated with the same billing system address (in some networks, multiple billing systems may be present). The address of the billing system is in one example an IP address of the billing system in an IP network 8. Whilst the IP network 8 is shown as a distinct network in FIG. 1, it will be appreciated that the network may be integrated into the existing signalling network (e.g. SS7/IP).

Associated with each MSC 4 is a Visitor Location Register (VLR) 9 which maintains a record of subscribers currently registered with the associated MSC 4. The record includes subscribers for whom the MSC 4 is a home MSC, as well as subscribers for whom the MSC 4 is a foreign network. The MSCs 4 are coupled to the IP network 8. In the event that the subscriber using the terminal 2 roams outside of the coverage area of his HPLMN 1 and into the coverage area of the VPLMN 3, his terminal 2 will seek to register with an MSC 4 of the VPLMN 3 after the MSC 4 has determined that the subscriber is a foreign network and has not already been registered in the associated VLR9.

The registration process is initiated by the terminal 2 sending to the serving MSC 4 the subscriber's IMSI (usually stored in a SIM card). In order to authenticate the subscriber, the MSC 4 uses the Mobile Application Part (MAP) protocol to send a MAP UpdateLocation message to the HLR 6 of the subscriber's HPLMN 1 (the HPLMN 1 is identified by a prefix part of the IMSI). Assuming that the HLR 6 verifies the IMSI contained in the message, the HLR 6 returns a MAP InsertSubscriberData message to the serving MSC. The returned message also includes the IP address of the billing system which is associated with the subscriber. In the event that the HLR 6 cannot verify the subscriber, an appropriate message is returned to the serving MSC 4.

Assuming now that the serving MSC 4 does indeed receive a MAP InsertSubscriberData message from the HLR 6 of the HPLMN 1, the subscriber is registered in the VLR 9. The received billing system IP address is also recorded in the VLR 9.

In the event that a subscriber initiates a connection, e.g. a voice call to a subscriber of the same or a different network, the MSC 4 retrieves the billing system IP address from the VLR 9. Once the connection is established, the MSC 4 proceeds to generate CDRs at regular intervals. The billing system IP address is placed into the header of each CDR. The CDRs are sent by the MSC 4, via the IP network 8, to the billing system 7 of the HPLMN 1. The CDRs may be used by the billing system 1 for the purpose of near real time billing and/or fraud control.

The CDRs may also be used to control the availability of services to the subscriber. For example, if the HPLMN 1 determines that the subscriber has exceeded his current credit limit, or that the balance of a pre-paid account has reached zero, the HPLMN 1 may decide to terminate the subscriber's connection. This may be achieved by the sending of a MAP CancelLocation message (which is an Immediate Service Termination function—see GSM 02.32) from the HPLMN 1 to the serving MSC 4. Other MAP messages may also be defined for instructing the serving MSC to take other specific actions as well as for confirming to the HPLMN the action taken by the serving MSC.

In the event that the IP address of the billing system in the HPLMN 1 is changed during or removed while a subscriber is registered with the foreign MSC 4, the data held in the VLR 9 may be updated using a DeleteSubsciberData MAP message.

Figure 2:
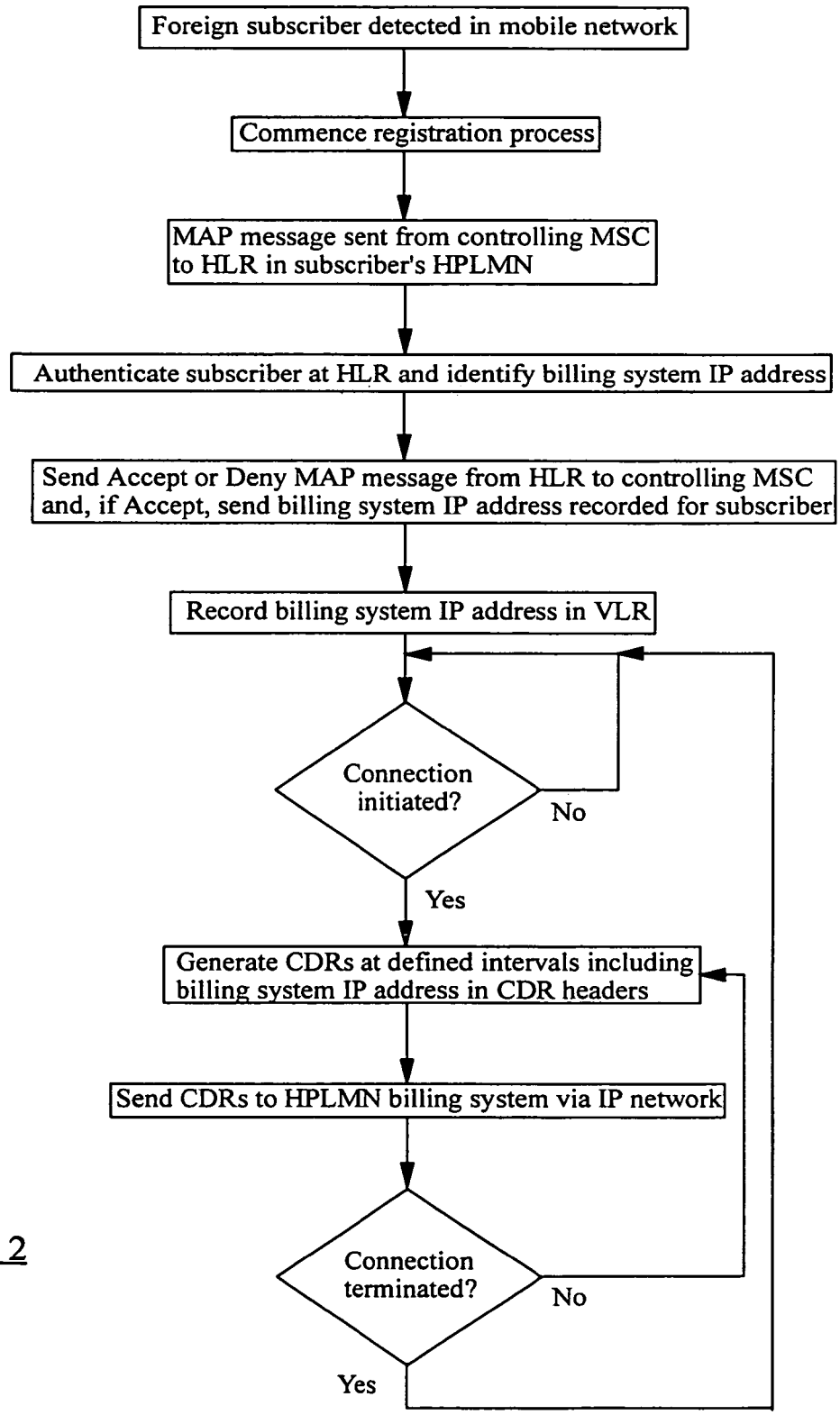
FIG. 2 is a flow diagram illustrating a method of controlling charging in the system of FIG. 1.

FIG. 2 is a flow diagram further illustrating the method described above.

Messages relating to charging events may be sent between the HPLMN 1 and the VPLMN 3 using the CAMEL protocol. CAMEL is a protocol which enables the real time transfer of charging related information (subject of course to small transmission delays). In this way it is possible to monitor the charging related activities of roaming subscribers in a way which does not greatly increase inter-network signalling traffic.

It will be appreciated by the person of skill in the art that various modifications may be made to the above described embodiment without departing from the scope of the present invention. For example, rather than GSM networks, the invention may be employed in third generation UMTS networks. It will further be appreciated that the terms used above, e.g. MSC, GMSC, etc, may have different equivalents in UMTS. The present invention applies to Gateway MSCs which may be required to collect billing information on behalf of a subscriber. For this purpose, a SendRoutingInfoResult MAP message (which is a response to a SendRoutingInformation MAP message) may be used to transport the billing system IP address from the HLR to the GMSC.

The invention claimed is:

1. A method of routing Call Detail Records (CDRs) for a subscriber to a billing center associated with the subscriber, wherein the subscriber is associated with a home network and is operating in a foreign network, and the billing center is associated with the subscriber in the subscriber's home network, the method comprising the steps of:

receiving in a serving Mobile Switching Center (S-MSC) in the foreign network, a registration message from a mobile terminal associated with the subscriber;

sending a location updating message from the S-MSC to the subscriber's Home Location Register (HLR) in the home network of the subscriber;

receiving in the S-MSC, a Mobile Application Part (MAP) data message from the HLR with subscriber profile information for the subscriber, said subscriber profile information including an Internet Protocol (IP) address of the billing center associated with the subscriber in the subscribers home network, wherein the billing center IP address is included in one of the MAP messages InsertSubscriberData, DeleteSubscriberData, and SendroutingInforesult;

storing the subscriber profile information in a Visitor Location Register (VLR) in the foreign network;

receiving thereafter, a call origination message from the mobile terminal;

in response to the call origination message, retrieving from the VLR, the IP address of the billing center associated with the subscriber;

establishing a connection between the mobile terminal and a called subscriber;

generating CDRs at regular intervals while the connection is established, said generating step including placing into a header of each CDR, the IP address of the billing center associated with the subscriber; and immediately sending, through the S-MSC, each CDR via an IP network to the billing center associated with the subscriber.

2. The method according to claim 1, wherein said home and foreign networks are GSM networks.

3. The method according to claim 1, wherein said home and foreign networks are GPRS networks or UMTS networks.

4. The method according to claim 1, further comprising utilizing the CDRs by the billing center to perform near real time billing for the subscriber operating in the foreign network.

5. The method according to claim 1, further comprising utilizing the CDRs to control service availability to the subscriber.

6. The method according to claim 1, further comprising utilizing the CDRs by the billing center to perform fraud control for the subscriber operating in the foreign network.

* * * * *

UNITED STATES PATENT AND TRADEMARK OFFICE
CERTIFICATE OF CORRECTION

| | |
|---|---|
| PATENT NO. | : 7,546,113 B2 |
| APPLICATION NO. | : 09/797224 |
| DATED | : June 9, 2009 |
| INVENTOR(S) | : Hakala et al. |

It is certified that error appears in the above-identified patent and that said Letters Patent is hereby corrected as shown below:

In Column 3, Line 46, delete "(VPLN)." and insert -- (VPLMN). --, therefor.

In Column 5, Line 35, in Claim 1, delete "subscribers" and insert -- subscriber's --, therefor.

Signed and Sealed this

Twentieth Day of October, 2009

David J. Kappos
*Director of the United States Patent and Trademark Office*